No. 688,113. Patented Dec. 3, 1901.
F. T. PLESTER.
MACHINE FOR MAKING AND FILLING PAPER PACKETS, &c.
(Application filed June 3, 1901.)
(No Model.) 9 Sheets—Sheet 1.

Witnesses:—
Benjamin Clark.
Charles H. Briggs.

Inventor:—
Frank Thomas Plester.
per:— E. Eaton.
His Attorney

No. 688,113. Patented Dec. 3, 1901.
F. T. PLESTER.
MACHINE FOR MAKING AND FILLING PAPER PACKETS, &c.
(Application filed June 3, 1901.)
(No Model.) 9 Sheets—Sheet 3.

Fig. 2.

Witnesses:-
Benjamin Clark
Charles H. Briggs

Inventor:-
Frank Thomas Plester.
per:- E. Eaton.
His Attorney.

No. 688,113. Patented Dec. 3, 1901.
F. T. PLESTER.
MACHINE FOR MAKING AND FILLING PAPER PACKETS, &c.
(Application filed June 3, 1901.)
(No Model.) 9 Sheets—Sheet 4.

WITNESSES: INVENTOR
Frank T. Plester
BY
Attorney

No. 688,113. Patented Dec. 3, 1901.
F. T. PLESTER.
MACHINE FOR MAKING AND FILLING PAPER PACKETS, &c.
(Application filed June 3, 1901.)
(No Model.) 9 Sheets—Sheet 5.

Witnesses:-
Benjamin Clark
Charles H. Briggs

Inventor:-
Frank Thomas Plester
per E. Eaton
His Attorney

No. 688,113. Patented Dec. 3, 1901.
F. T. PLESTER.
MACHINE FOR MAKING AND FILLING PAPER PACKETS, &c.
(Application filed June 3, 1901.)
(No Model.) 9 Sheets—Sheet 6.

WITNESSES:
INVENTOR
Frank T. Plester
BY
Attorney

No. 688,113. Patented Dec. 3, 1901.
F. T. PLESTER.
MACHINE FOR MAKING AND FILLING PAPER PACKETS, &c.
(Application filed June 3, 1901.)
(No Model.) 9 Sheets—Sheet 9.

Witnesses:
Benjamin Clark
Charles H. Bregg

Inventor:
Frank Thomas Plester.
per: E. Eaton
His Attorney.

UNITED STATES PATENT OFFICE.

FRANK THOMAS PLESTER, OF LONDON, ENGLAND.

MACHINE FOR MAKING AND FILLING PAPER PACKETS, &c.

SPECIFICATION forming part of Letters Patent No. 688,113, dated December 3, 1901.

Application filed June 3, 1901. Serial No. 63,001. (No model.)

*To all whom it may concern:*

Be it known that I, FRANK THOMAS PLESTER, a subject of the King of Great Britain, and a resident of Lavender Hill, London, England, have invented certain new and useful Improvements in Machines for Making and Filling Paper Packets, &c., (for which I have applied for a patent in Great Britain, No. 11,905, dated July 2, 1900,) of which the following is a full, clear, and exact specification.

According to this invention a packet is formed with its widest faces at the top and bottom and the packet is closed on the top. The blank papers have their corners mitered off to facilitate the closing of the top. A card is inserted on the top of the material when the packet is filled.

The machine consists of a folding die comprising a bottom, four sides hinged to the bottom, and extensions hinged to the outer edges of the two longer sides, a rising-and-falling table supporting the die, a hollow rectangular plunger for depressing the die and table, fixed cams or projections that when the table is depressed raise the hinged sides and their extensions, knives or blades at the vertical angles that are operated by the descending plunger to pass from the vertical angles inward parallel to the finished sides, a means for supplying the desired quantity of material to the hollow tube, a receptacle for holding cards, means for inserting a single card into the hollow plunger, a hollow plunger sliding inside the first hollow plunger and forcing down the card onto the top of the material in the box, paster-blades adapted to be passed from a paste-receptacle to fold the ends over the top and be afterward withdrawn and reinserted into the paste-receptacle, and cams or projections adapted first to fold one extension and then the other over the top and onto the paster-blades, rollers adapted to be passed with spring-pressure over the top of the folded extensions, and a means for forcing upward the table, with the die and box. By the action of the die closing up the paper is folded around the plunger, the material to be packed falls down inside the tube and plungers, and the card is fed in through a slot in the plunger and forced down by a grid and acts as a stamper to level and squeeze the material into position.

In the accompanying sheets of illustrative drawings, Fig. 1ª is a view, similar to Fig. 1, of the lower portion of the machine; Fig. 2ª is a view, similar to Fig. 2, of the lower portion of the machine; Fig. 3ª is a view, similar to Fig. 3, of the lower portion of the machine.

Referring more especially to Figs. 4, 5, 6, and 7, the mold consists of the bottom 1, the four sides 3 4 5 6, hinged to the edges of the bottom 1, and the extensions 35 38, hinged to the outer edges of the longer sides 3 4. The bottom 1 of the mold is fixed upon a rising-and-falling rod or table 46, and the hinged sides rest upon fixed projections 3ª 4ª 5ª 6ª, respectively.

The hollow plunger 2 is rectangular and is of the same sectional dimensions as the bottom of the box, so that the packet is folded up around the plunger. The plunger 2 is connected by links 141 to arms 142 on a shaft 143, on which is fixed the lever-handle 14. A second hollow plunger 24, having an open grating 23 at its lower end, is adapted to slide within the plunger 2. The plunger 24 is connected by links 25 to arms 251 on a shaft 252, on which is fixed the lever-handle 26. A rectangular tube 47, sliding in the hollow plunger 24, communicates with a hopper 56, containing the material to be packed.

The four tuckers or blades 10 are adjustably mounted on four arms 7, fixed on two shafts 8, mounted on arms 9, fixed on the hollow plunger 2. Fixed on one end of the shafts 8 are arms 12, that when the plunger 2, and consequently the shafts 8, are lowered come into contact with adjustable projections 13, carried on a T-shaped bar 131, connected by a link 132 to a lever 133, having a spring end 134. As the lever 14 is lowered to lower the plunger 2 it comes into contact with the spring end 134 and operates the lever to raise the projections 13. The blades 10 are thus forced quickly inward by the double motion.

Figure 1:
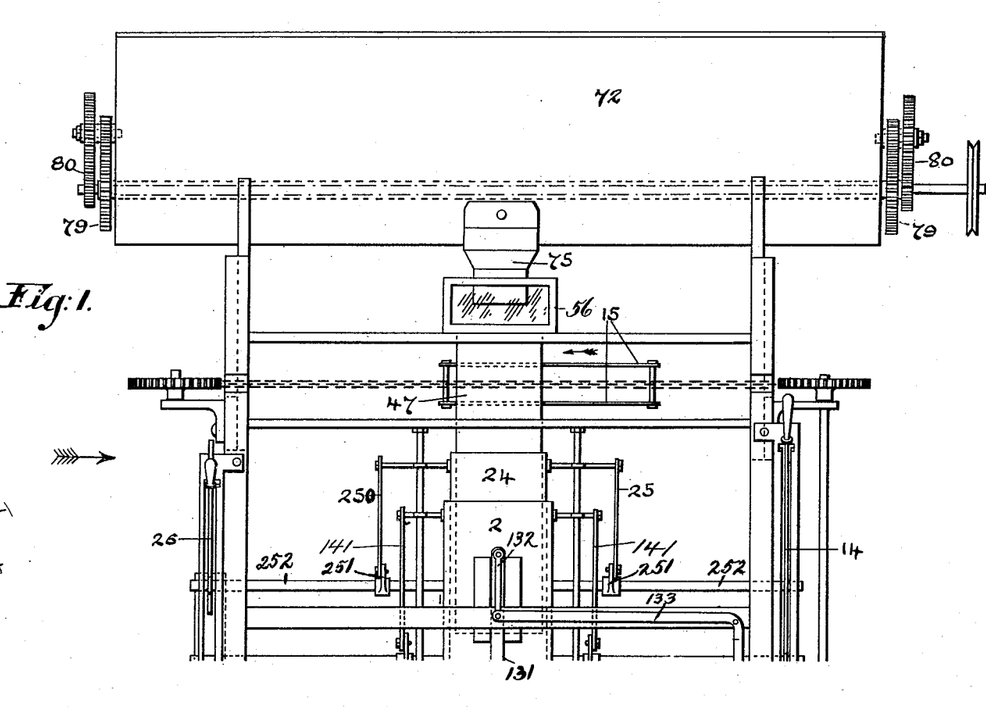
Figure 1 is a front view.
Figure 1A:
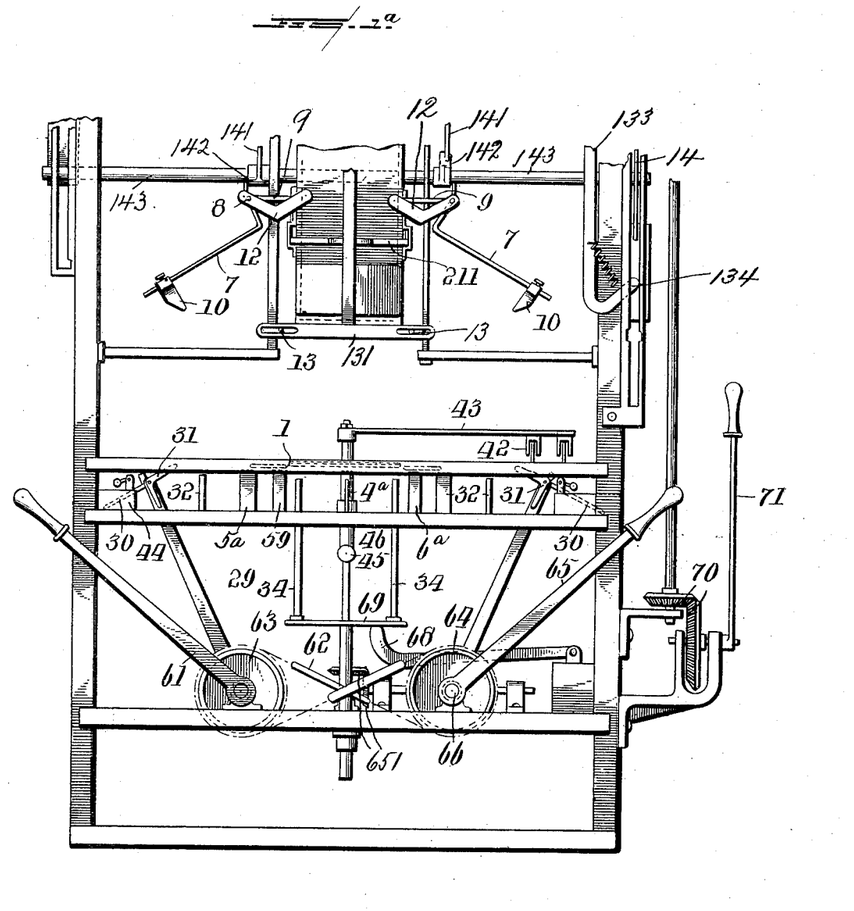
Figure 2:
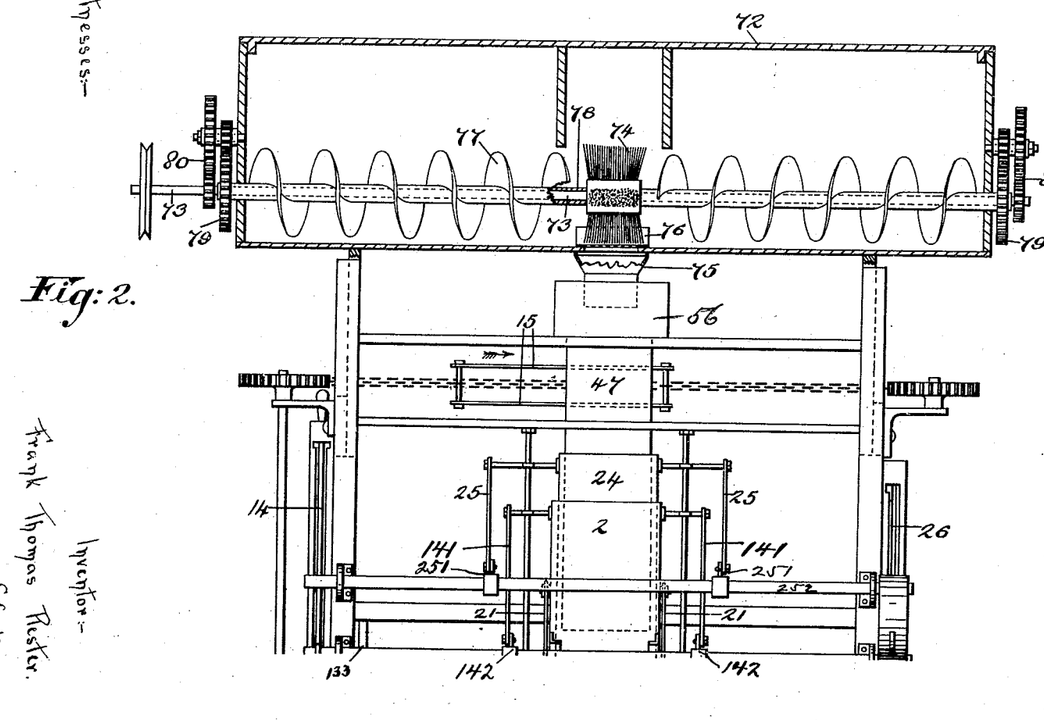
Fig. 2, a back view.
Figures 3, 15, 16:
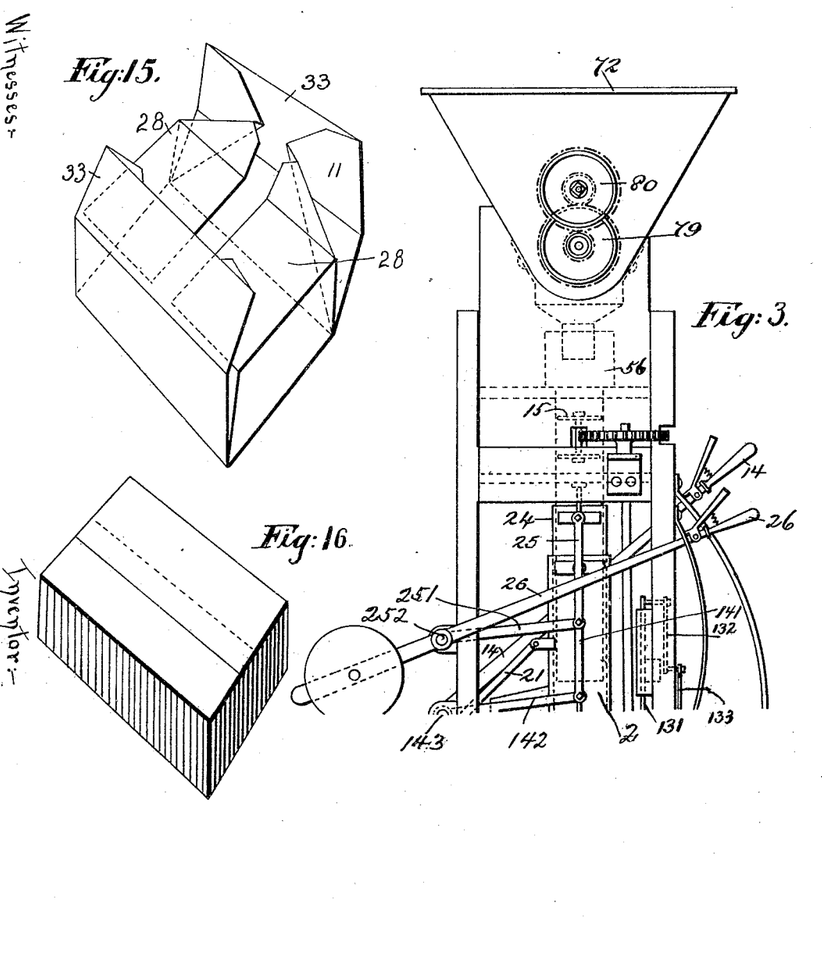
Fig. 3, a side elevation looking in direction of arrow, Fig. 1.
Fig. 15, a perspective view of same, partially folded.
Fig. 16, a view of packet folded.
Figure 4:
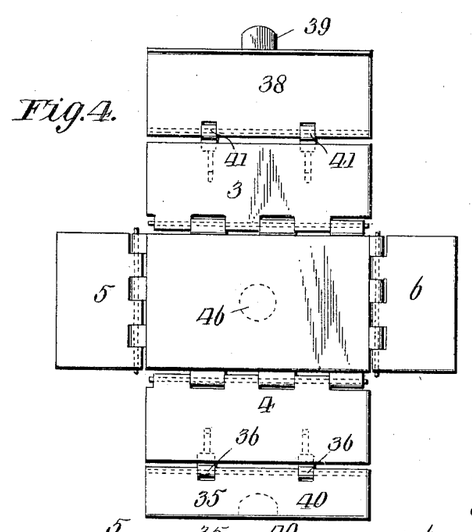
Fig. 4, a plan view of mold in open position to enlarged scale.
Figure 4A:
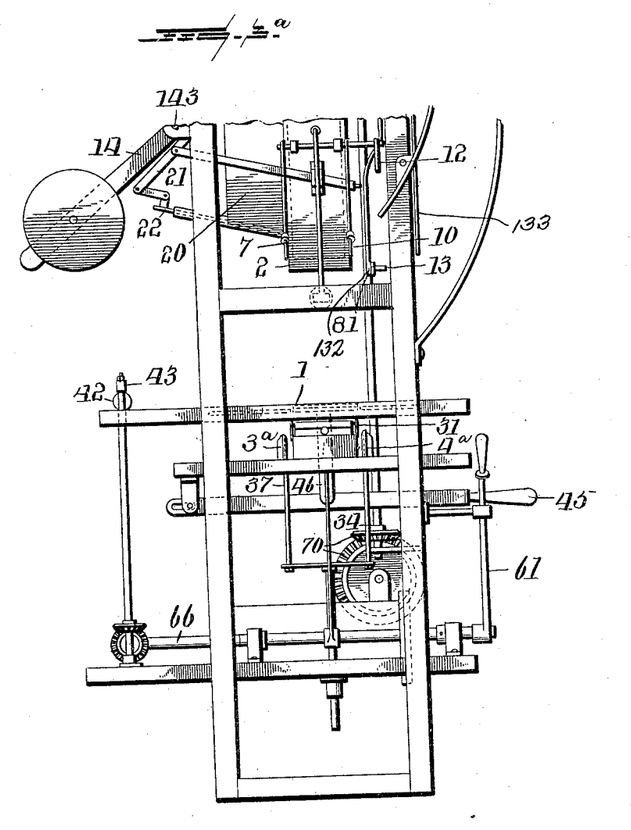
Figure 5:
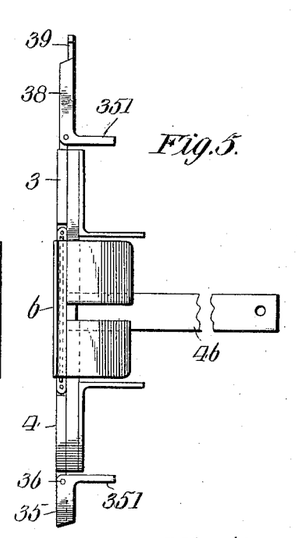
Fig. 5, a side elevation of same.
Figure 5A:
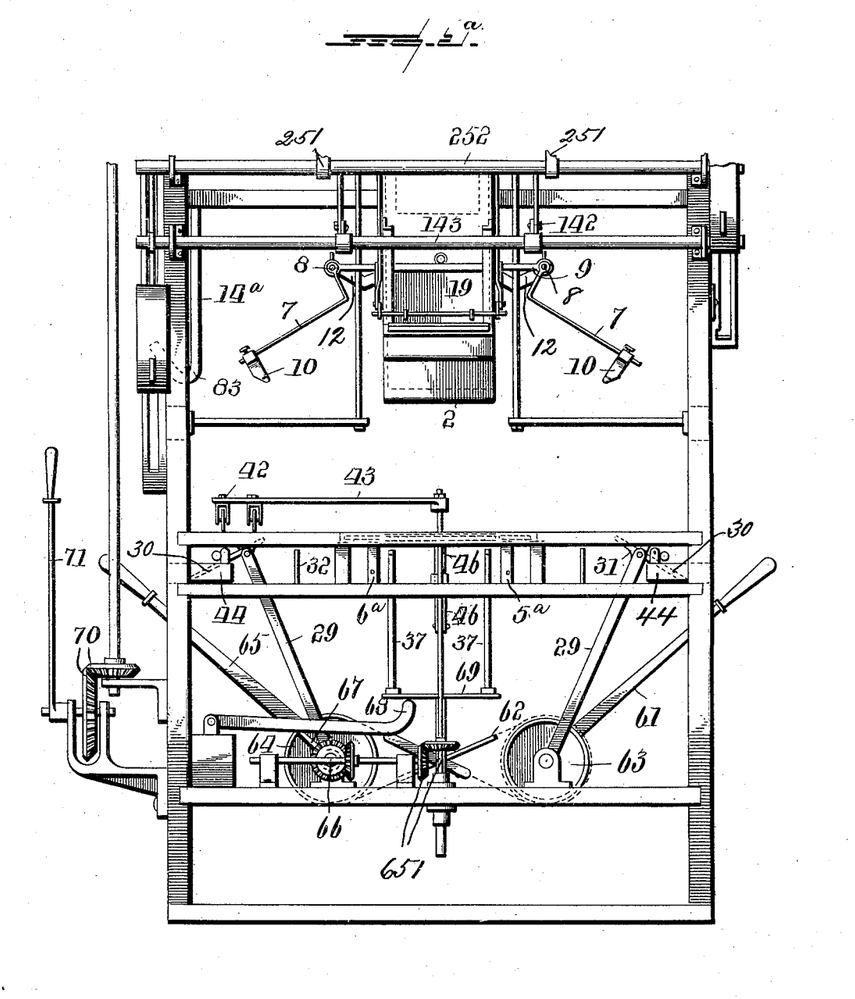
Figures 6, 7, 8:
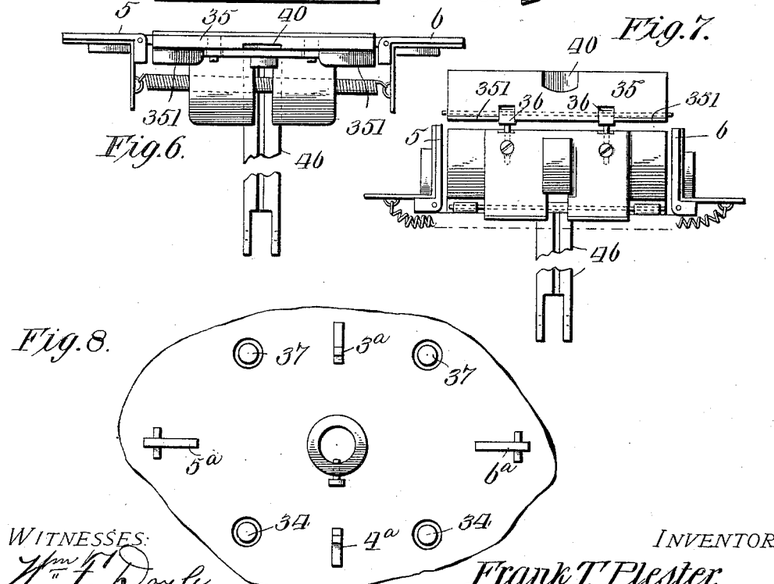
Fig. 6, a front elevation of same.
Fig. 7, a front elevation of same previous to final stage of folding.
Fig. 8, a plan view of means for closing the mold.
Figure 14:
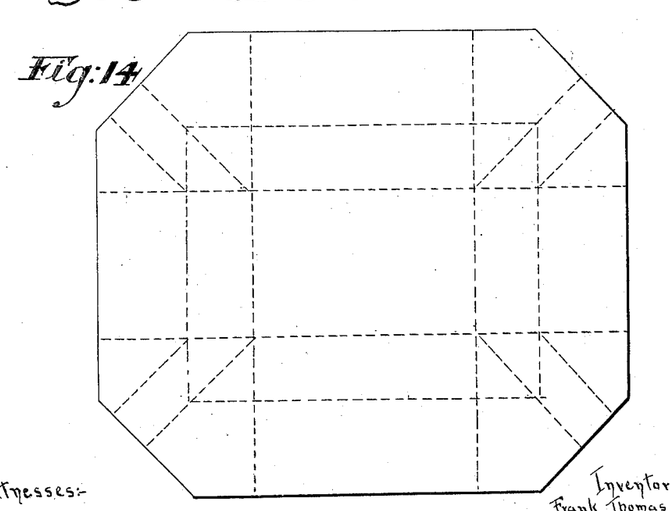
Fig. 14, a plan view of the blank.

The paper shown in Fig. 14 is placed upon the mold. The portion 2 of the telescopic plunger is then lowered, by means of the lever 14, onto the mold-bottom and forces it downward, whereby the sides 3, 4, 5, and 6, which rest on fixed projections 3ª 4ª 5ª 6ª, respectively, Fig. 8, are caused as the bottom descends to gradually rise upward and assume a vertical position, carrying with it, of course, the paper. Just previously, however, to their attaining an absolutely-vertical position the adjustable blades 10 are forced inward, so that the opposite blades 10 almost meet, the paper at that point being in between them, thus forming the tucks or folds 11, as shown in Fig. 15. The movement of the tuckers are carefully adjusted, so that the projections 10 come into position for making the tuck just at the right moment and quickly.

The substance to be packed is fed through the telescopic tube and falls onto the paper. The substance may be either measured or weighed. In Figs. 1, 2, 3, 9, and 10 is shown the measuring arrangement, which consists of a pair of parallel plates 15, sliding across the tube 47. The top plate has a hole or aperture 16 at one side and the bottom plate a hole or projection 17 at the other side. In the center each plate is solid. In their position shown in Fig. 1 the substance will be resting upon the bottom plate, having passed through the hole 16. Upon movement of these plates in the direction of the arrow by the gear-wheels 70 and lever 71 the supply from the top is first cut off and then the material contained in the space 18 is brought into communication with the hollow plunger through the hole 17 in the bottom plate. The material falls down the telescopic plungers onto the paper. The quantity of substance in the space 18 contained in the tube 47 between the two parallel plates will of course be the requisite quantity according to the size of the packet.

Figures 9, 10, 11:
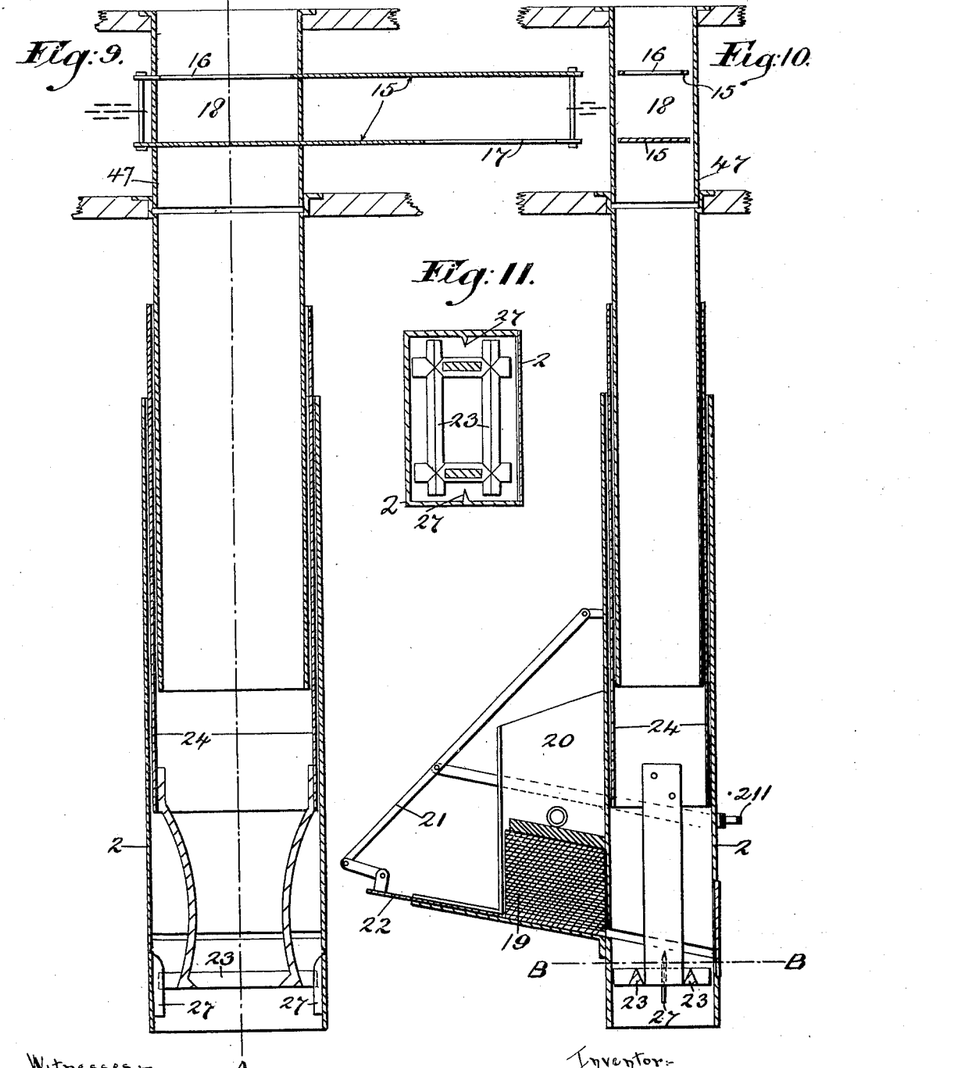
Fig. 9, a sectional front elevation of telescopic tubes, showing the compressing-grid.
Fig. 10, a sectional side elevation through line A A, Fig. 9, showing arrangement for insertion of the packing-card.
Fig. 11, a section through line B B, Fig. 10.
Figure 12:
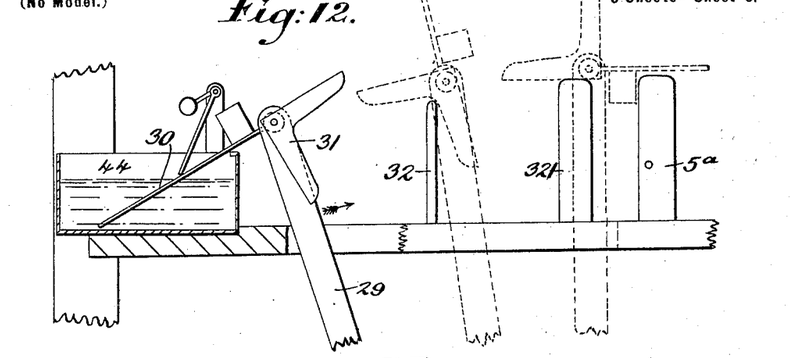
Fig. 12, a side elevation showing gumming arrangement on one side only, partly in section.
Figure 13:
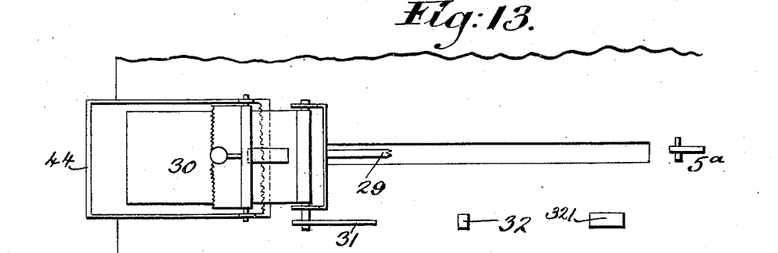
Fig. 13, a plan view of the same.

The receptacle 20 for the cards 19 to cover the top of the substance in the packet is attached, together with its operating mechanism, to the plunger 2. The slide 22, forcing out the cord into the hollow plunger, is operated by the levers 21, actuated by hand by means of the loop or strap 211. One of the cards 19 contained in the receptacle 20 is caused to enter the part 2 of the telescopic tube by means of the plate 22, which pushes forward the bottom card into the part 2 of the telescopic plunger. This card is then forced downward onto the material in the packet by means of the grid 23, carried by the part 24 of the telescopic plunger and operated by the pivoted lever 26. This operation packs the substance in the mold to the proper degree. The projections 27, Figs. 9 and 10, are for the purpose of guiding the card, so as to keep it in a horizontal position, down the passage. The part 2 of the telescopic plunger is then raised from off the paper, and after it has risen above the lower level of the grid 23 the latter is also raised, thereby freeing the card aforesaid and preventing same being lifted up by the part 2 of the telescopic plunger. The parts 2 and 24 of the telescopic plunger are then raised back to the position shown in Figs. 1, 2, and 3, the card being left on the top of the substance which is then contained by the packet when partially folded, as shown in Fig. 15, as aforedescribed. The ends 28 of the packet are then folded over to position shown in Fig. 15 by the operation of the plates 30, normally resting in the paste-receptacle 44. The plates 30 are carried at the upper ends of levers 29 and are connected to the angle-pieces 31, which during their passage in the direction of the arrows come into contact successively with the projections 32 and 321, carried by the framework of the machine, each projection causing them to make a quarter-rotation, so that the pasted end of the plates 30 comes into and contact with folds down the ends 28 of the paper. The levers 29 are operated by the lever 61, which moves simultaneously by means of the cross-bands 62 and pulleys 63 and 64, attached to the levers 29, the pulley 64 running freely on its spindle 66. The portions 33 of the packet now remain to be folded down, which is accomplished as follows and shown in Fig. 3. The rods or projections 34 are raised and engage on the under side of the portion 351 of the mold extension 35 which is at that instant in a horizontal position turning outward, and turn the extension 35 on its pivots 36 and fold it down on the top of the packet, carrying with it one of the portions 33 of the packet. 37 represents similar rods or projections to the projections 34 and operate part 38 of the mold in a similar manner, but being somewhat shorter than the projections or rods 34 the operation of the part 38 will be somewhat later than the part 35. The projections 34 and 37 are operated by means of the lever 65, operating the spindle 66, carrying the cam 67, bearing upon and operating the pivoted lever 68, which is raised, so raising the rods or projections 34 37 by bearing on the under side of the connecting-bar 69. The tab or projections carried by the part 38 will fit into the corresponding depression 40 in the part 35. Thus the paper is completely folded. While the mold is still surrounding the paper, the rollers 42, carried by the spring-pivoted arm 43, are operated by the lever 65 through the two bevel-gears 651 so that they revolve and bear upon the top of the mold, the pressure in the spring-arm 43 being sufficient to cause the gum carried by the plates 30 aforesaid, which are now in position between the folds of the paper, to adhere thereto. While this pressure is exerted on the top of the mold the side plates 30 are withdrawn, leaving behind them the gum, which they pick up from the receptacles 44 when in position shown in Figs. 1 and 2. The rods or projections 34 and 37 are lowered and the rods return to their initial position and the whole of the mold raised by means of the lever 45, to which is pivoted the rod 46, attached to the under side of the mold, and the various parts fall back into their initial position, leaving the paper packet folded and secured, as shown in Fig. 16.

The hopper 72 is provided with the spindle 73, which carries at its center the brush 74. I find this is necessary when working with very fine powders, as they are apt to clog and not flow away through the aperture 75; but by providing this brush the substance is pushed or brushed through a perforated plate 76, thereby obviating this difficulty. This brush may be removed when required, as when dealing with loose substances, such as seeds. 77 is a helical screw carried by a loose sleeve 78 and independently operated by means of the gear-wheel 79, the gear-wheel 80 operating the spindle 73.

What I claim, and desire to secure by Letters Patent, is—

1. A machine for folding open-topped paper boxes or packets, consisting of a rising-and-falling table, a folding-die having the four sides hinged to the bottom and mounted on the rising-and-falling table, a rectangular plunger for depressing the die and table, fixed cams or projections for raising the hinged sides to the vertical positions when the die is depressed, and knives or fingers at the angles that are operated by the descending plunger to pass from the four vertical angles in along the sides as the sides are being raised.

2. A machine for folding and filling paper boxes or packets consisting of a folding-die comprising a bottom, four sides hinged to the bottom, and two extensions hinged to the outer edges of the longer sides; a rising-and-falling table supporting the die, a hollow rectangular plunger for depressing the die and table, fixed cams or projections that when the table is depressed raise the hinged sides and their extensions, knives or blades at the vertical angles that are operated by the descending plunger to pass from the vertical angles inward parallel to the finished sides, a means for supplying the desired quantity of material to the hollow plunger, folders adapted to fold down the ends over the top, and cams or projections adapted to act on the extensions and fold them over the top, first one and finally the other.

3. A machine for folding and filling paper boxes or packets, consisting of a folding-die comprising a bottom, four sides hinged to the bottom, and extensions hinged to the outer edges of the two longer sides; a rising-and-falling table supporting the die, a hollow rectangular plunger for depressing the die and table, fixed cams or projections that when the table is depressed raise the hinged sides and their extensions, knives or blades at the vertical angles that are operated by the descending plunger to pass from the vertical angles inward parallel to the finished sides, a means for supplying the desired quantity of material to the hollow tube, paster-blades adapted to be passed from a paste-receptacle to fold the ends over the top and be afterward withdrawn and reinserted into the paste-receptacle and cams or projections adapted first to fold one extension and then the other over the top and onto the paster-blades.

4. A machine for folding and filling paper boxes or packets, consisting of a folding-die comprising a bottom, four sides hinged to the bottom, and extensions hinged to the outer edges of the two longer sides; a rising-and-falling table supporting the die, a hollow rectangular plunger for depressing the die and table, fixed cams or projections that when the table is depressed raise the hinged sides and their extensions, knives or blades at the vertical angles that are operated by the descending plunger to pass from the vertical angles inward parallel to the finished sides, a means for supplying the desired quantity of material to the hollow tube, a receptacle for holding cards, means for inserting a single card into the hollow plunger, a hollow plunger sliding inside the first hollow plunger and forcing down the card onto the top of the material in the box, paster-blades adapted to be passed from a paste-receptacle to fold the ends over the top and be afterward withdrawn and reinserted into the paste-receptacle and cams or projections adapted first to fold one extension and then the other over the top and onto the paster-blades, rollers adapted to be passed with spring-pressure over the top of the folded extensions and a means for forcing upward the table with the die and box.

In testimony that I claim the foregoing I have hereunto set my hand this 22d day of March, 1901.

FRANK THOMAS PLESTER.

Witnesses:
BENJAMIN CLARK,
ALFRED WILLIAM WOOD.